United States Patent Office 3,207,698
Patented Sept. 21, 1965

3,207,698
COMPOSITION AND METHOD FOR
DEFOAMING AQUEOUS SYSTEMS
Raymond Liebling, Springfield, and Nicholas M. Canaris, Cedar Grove, N.J., assignors to Nopco Chemical Company, Newark, N.J., a corporation of New Jersey
No Drawing. Filed Feb. 13, 1963, Ser. No. 258,128
9 Claims. (Cl. 252—321)

This invention relates to anti-foaming or defoaming compositions which are particularly useful for preventing or abating foams in aqueous systems. More particularly, the present invention relates to new and novel defoaming compositions which are especially adapted to defoam concentrated or dilute black liquor produced during an alkaline or an acid pulping process.

The soda and kraft or sulfate processes are commonly referred to as alkaline pulping processes, since the chemicals used are essentially sodium hydroxide or caustic in the former and sodium sulfate or salt cake and sodium hyroxide in the latter. These processes currently represent the most utilized pulping procedures in the pulp and paper industry. One of the reasons for the continued growth of these processes is that the spent chemicals can be reclaimed and reused, thus giving an economic advantage over other methods. However, one of the greatest disadvantages of these processes is the troublsome foam which occurs during the pulp washing, screening and knotting operations.

The alkaline pulping process is performed by first cooking the wood chips in digseters and then draining off the spent chemicals for reuse. The resulting fiber or pulp is then washed free, in brown stock washers, of a large amount of the residual chemicals referred to as black liquor. The black liquor in these washers contains about 14% to 18% by weight of dissolved solids, has a pH of about 12 and is referred to as concentrated black liquor.

Black liquor is a foamy material, its foaming increasing with an increase in the resin content of the wood used in the process. These brown stock washers are a series of vats, usually three or four in number, which alternately dilute the pulp with water and thicken it by picking it up or larger rotary screens. From the brown stock washers, the pulp travels to the screen room where it is again diluted with water and put through vibrating screens which accept the now completely delignified fibers and reject the clumps of unpulped fibers, knots and other foreign material. Foam problems are severe in the screen room since the diluted pulp which contains a small amount of residual black liquor is subjected to violent agitation by the screens. The water removed from the pulp after the screening operation, usually called dilute black liquor, is normally used as the dilution water for the third or fourth stage of the brown stock washers, for the sake of economy. This dilute black liquor is a foaming material, containing from about 0.001% to 0.1% by weight of solids and has a pH of about 12.

Defoamers are generally used in most alkaline pulp mills during the screening operation so that more efficient screening is accomplished and to prevent the pulp thickeners, utilized after the screening operation, from becoming clogged with entrapped air. When water dispersible defoamers are used during the screening operation, a small amount is retained by the dilution water which is returned to the third and/or fourth stage of the brown stock washers. This usually prevents foam from becoming a severe problem in the washing operation. However, in mills where foam is not troublesome in the screening operation or where water insoluble defoamers such as kerosene are used in the screen room and are absorbed by the fiber rather than being emulsified into the dilute black liquor, the dilute black liquor from the screen room which is returned to the brown stock washers contains no defoamer. In these instances, foaming has been found to be a problem at the third and/or fourth stage of the brown stock washers thereby seriously interfering with the washing and thickening operations.

Heretofore, commercial silica defoamers such as those disclosed in Australian patent application No. 62,633, filed July 18, 1960, have proved very successful for preventing and/or abating foam in aqueous systems, particularly the foam in the concentrated and/or dilute black liquor produced in the soda and kraft or sulfate paper processes. Such defoamers, in order to provide adequate defoaming, must contain a small percentage of a spreading agent which is necessary to allow the silica to spread throughout the aqueous system which is to be defoamed. These spreading agents add appreciably to the cost of the process and/or product in which they are used. Furthermore, these spreading agents reduce defoaming properties of the silica due to the fact that they produce additional foam in the system which is to be defoamed. A further disadvantage of utilizing spreading agents is that these spreading agents dilute the defoamer, thus reducing the effectiveness of these silica defoamers in aqueous systems.

Accordingly, it is an object of the present invention to provide for a novel, inexpensive, defoamer composition formed of relatively cheap materials whereby the need for a spreading agent is eliminated.

Another object of this invention is the provision of the process for abating or preventing foaming in aqueous systems, utilizing a new and novel defoamer whereby the need for spreading agents is eliminated.

Another object of this invention is to provide new and improved anti-foaming and/or defoaming compositions which are especially adapted to control foaming of concentrated and/or dilute black liquor in the brown stock washers used in the alkaline pulping process.

A still further object of this invention is to provide for improved anti-foaming and/or defoaming compositions which not only control foaming in the brown stock washers, but which also control foaming during the screening operation as well as in other steps or operations of an alkaline pulping process.

A still further object is to provide a new and improved defoamer for use in latex paints.

Other objects will become apparent from the detailed description given hereinafter. It is intended, however, that the detailed description and specific examples are not limiting, but merely indicate the preferred embodiments of this invention since various changes and modifications within the scope of the invention will become apparent to those skilled in the art.

In accordance with the present invention we have discovered that new and novel defoamers containing (1) from about 3 to 30% by weight of a hydrophobic precipitated silica having a pH of from about 8 to about 10, an average particle diameter of about 0.005 to 0.050 micron and a surface area of about 200 to 400 square meters per gram, and (2) from about 70 to 97% by weight of an aliphatic, alicyclic or aromatic hydrocarbon or mixtures thereof containing at least six carbon atoms, can be utilized to prevent or abate foam in aqueous systems. These novel defoamers are particularly well suited for preventing and/or abating foam in aqueous systems such as in concentrated and/or dilute black liquor systems produced during the alkaline pulping process, in latex systems, in latex paint systems and in acidic white water systems of the paper making process. The defoamers of this invention can be applied and dispersed directly into the aqueous liquid such as concentrated and/or dilute black liquor and latex paints in relatively small amounts without the need of incorporating a spreading agent therein, to produce excellent defoaming characteristics. Hence the new and novel defoaming compositions of this invention are highly effective defoamers without the need for spreading agents. Also the defoaming agents of this invention do not suffer from the disadvantages inherent in utilizing spreading agents. Additionally, by utilizing the defoaming agents of this invention, the need for utilizing a wetting or spreading agent is eliminated, thereby reducing the cost of the defoamer and in turn the cost of the process and/or products in which they are used.

The phenomena whereby a more efficient defoaming action is produced in aqueous systems by utilizing the new and novel defoamers of this invention over the silica defoamers heretofore used is attributable to the specific precipitated silica which is used in formulating the hydrophobic silica component. This is shown by the fact that the precipitated silica must contain particles having an average diameter of from about 0.005 to 0.050 micron preferably 0.009 to 0.020 micron as well as a surface area of about 200 to 400 square meters per gram, preferably 250 to 300 square meters per gram, and a pH of from about 8 to 10, preferably 8 to 9. If a precipitated silica having different characteristics or a non-precipitated silica is used in formulating the hydrophobic silica utilized in the defoaming composition, a defoaming agent is formed that does not have the unique and beneficial defoaming properties inherent in the defoaming composition of this invention. The precipitated silicas which are utilized are generally prepared by adjusting the pH of an aqueous solution of sodium silicate to from about 8 to 10, precipitating the silica by reacting the sodium silicate with a dilute inorganic acid while maintaining the pH at from about 8 to about 10. An example of such a precipitated silica for use in accordance with this invention is Quso G30 manufactured by Philadelphia Quartz Company, Philadelphia, Pennsylvania.

These precipitated silicas which are utilized in the composition of this invention are relatively hydrophilic. Hence these silicas should in most cases be treated in some manner to render them relatively hydrophobic so that they can be utilized in aqueous systems. Any suitable method may be employed for treating the normally hydrophilic silica to render it hydrophobic. One method which has proved very satisfactory is to permanently affix a liquid hydrophobic polysiloxane oil onto the silica particles. Any suitable method may be employed for permanently affixing the polysiloxane oil onto the silica particles. One method involves spraying a polysiloxane oil onto the precipitated silica particles. After the polysiloxane oil has been sprayed on the silica particles, the sprayed particles are then heated for at least one-half hour at temperatures of above 150° C. If heating is not carried out the polysiloxane oil can be easily eluted from the precipitated silica particles. The heating may be carried out for periods of up to about 30 hours, preferably about 17 hours, but generally heating is stopped after 20 hours since no beneficial results are produced by such prolonged heating. Any temperature above 150° C. may be utilized to permanently affix the polysiloxane oil on the silica particles. Generally temperatures above 350° C. will degrade many of the lower boiling polysiloxane oils. Hence it is seldom necessary or advantageous to utilize temperatures above 350° C.

The polysiloxane oil that is affixed to the precipitated silica particles so as to render the precipitated silica hydroprobic, may be any alkyl, aryl, alicyclic or aralkyl siloxane or polysiloxane having a viscosity of from about 10 centistokes to about 3000 centistokes at 25° C. Generally the alkyl polysiloxanes are preferred which have viscosities of from 40 centistokes to 1000 centistokes at 25° C. Typical alkyl polysiloxanes which may be utilized to render the silica relatively hydrophobic include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, didodecyl polysiloxane, etc. (all having viscosities of from about 10 to 3000 centistokes at 25° C.). The amount of the polysiloxane oil utilized to treat the precipitated silica for a period of at least one-half hour to render the silica hydrophobic, may vary from 0.5% to about 50% by weight based on the weight of the hydrophobic precipitated silica component. However, amounts from about 0.5% to about 20%, based on the weight of the hydrophobic precipitated silica component (hydrophilic silica and the polysiloxane oil), of the polysiloxane oil, treating times of from about one-half hour to about three hours are usually satisfactory and are preferred.

The relatively hydrophilic silica may also be rendered hydrophobic by treatment with organo-silicon halides or mixtures of organosilicon halides. Examples of organo-silicon halides suitable for this purpose are given in U.S. 2,306,222 and U.S. 2,412,470, and included alkyl, aryl alicyclic and/or aralkyl silicon halides. The organo-silicon halides which may be used to render the hydrophilic silica hydrophobic include organic halosilanes such as dimethyl dichloro silane, diphenyl dichloro silane, diethyl dichloro silane, dimethyl dibromo silane, phenyl methyl dichloro silane, etc. The treatment of the relatively hydrophilic silica with the organo silicon halide can generally be carried out by agitating the finely divided silica in a closed container in the presence of vapors of the organo-silicon halide so that the vapors of the organo-silicon halide will be adsorbed on the relatively hydrophilic silica. The resulting precipitated silica particles are then rendered relatively hydrophobic since the organo-silicon halide adsorbed on the silica is converted to corresponding organic polysiloxane due to the presence of moisture within the precipitated silica. In carrying out this treating step, the amount of organo-silicon halide and the length of treatment will vary depending upon the surface area of the precipitated silica and the nature of the organo-silicon halide employed. In carrying out this procedure, it will be satisfactory to use from about 0.5 to 50% by weight based upon the weight of the hydrophobic precipitated silica, of the organo-silicon halide and a time of treatment of at least one-half hour. Generally it is preferred to use from about 0.5% to 20% by weight based upon the weight of the precipitated, hydrophobic silica, of the organo-silicon halide and a treating time of from about one-half hour to about three hours.

In order for the hydrophobic precipitated silica particles to be introduced into an aqueous system to defoam the system, the silica particles should be dispersed in a liquid hydrocarbon carrier. These liquid hydrocarbons may be any liquid aliphatic, alicyclic, aromatic hydrocarbons or mixtures thereof. The liquid aliphatic, alicyclic or aromatic hydrocarbons suitable for use in the practice of this invention are liquids at room temperature and atmospheric pressure, have a viscosity of about 30 SUS to 400 SUS (Saybolt Universal seconds at 100° F.), a minimum boiling point of at least 150° F. and contain from 6 to 25 carbon atoms. Hydrocarbons such as benzene, hexane, heptane, octane, mineral seal oil, naphtha, naphthenic mineral oil, paraffinic oil and mineral oil, etc. are examples of some of the compounds which have been found to be suitable for use as the liquid hydrocarbons component in the novel compositions of this invention. If desired, mixtures of any two or more of these or similar hydrocarbons can be employed such as the commercial conventional mixtures. In the practice of this invention the liquid aliphatic, alicyclic or aromatic hydrocarbon component comprises from about 70 to 97% by weight of the novel defoaming compositions.

When the liquid hydrocarbon is added to the hydrophobic precipitated silica, a gel-like structure results. Generally since the hydrophobic precipitated silica particles are in the form of a conglomerate or gel due to the presence of organic hydrocarbon liquid, it is sometimes necessary to break the gel by shearing so as to allow the silica particles to be easily dispersed into the aqueous system which is to be defoamed. The breaking of the gel may be accomplished by homogenization under pressures of from 10 lbs. per square inch to 8000 lbs. per square inch or by ultrasonic mixing. Many other processes such as mixing or grinding may be utilized to destroy the gel-like structure of the silica particles.

The defoamers of this invention are especially adapted to defoam aqueous systems which contain foam producing solids such as latex, glues, resinous materials, starches, etc. The defoaming compositions are used in amounts of from about 0.01% to about 0.5% by weight of the dry foam producing solids in the aqueous system. Amounts in excess of about 0.5% by weight can be utilized to defoam the aqueous systems but generally such amounts are not practical due to the high cost of the defoamer.

The defoaming compositions of this invention are especially adapted for use in the alkaline pulping process where they produce unexpected and unique defoaming properties. The defoaming compositions of this invention are used in the alkaline pulping process in the following manner. The foaming composition can be introduced into the brown stock washers in the third or fourth stage of the washers which contain the concentrated black liquor. The defoaming compositions are used in amounts of 0.01% to about 0.5% by weight based on the weight of the dry solids present in the concentrated or dilute black liquor systems. Thus, by utilizing our defoaming compositions foaming of the black liquor in the brown stock washers is controlled. Moreover, because some of the defoamer is carried through during the pulping process, control of foaming in other stages of the process is accomplished such as the screening process, where as stated before, foaming is severe.

The defoamer of this invention may be utilized in defoaming the dilute black liquor. In this case, the foaming composition of this invention can be added to the pulp in the screen room in the same approximate amounts as that utilized for defoaming the concentrated black liquor. Thus by utilizing our defoaming compositions, foaming of the dilute black liquor in the screening and subsequent paper making operations where foaming is severe, is practically eliminated.

The defoaming compositions prepared in the foregoing examples were evaluated by testing their ability to defoam concentrated black liquor obtained from a paper mill having about 16% by weight of solids. The apparatus used in evaluating the foaming composition can be described as follows. A beaker of 1000 cc. capacity (tall form) is used. A curved outlet fused onto the base of the beaker is connected with a rubber hose to a centrifugal pump. The pump is used to continuously cycle the concentrated black liquor from the beaker to the pump and back into the beaker. The pumping is carried out at a rate so that the black liquor in the beaker is agitated by the reentering liquid to such an extent that the formation of foam appears. In practice the rate is approximately two gallons per minute. The concentrated black liquor enters the beaker at a point about 2¼ inches above the surface of the liquid in the beaker and strikes the surface of the liquid in the beaker at an angle of 90°.

In carrying out the testing of the defoamer compositions, 500 cc. of concentrated black liquor at 180° F. which contained about 16% by weight of solids was placed in the beaker of the apparatus. This liquid, when quiescent and at a temperature of 180° F. filled the beaker to a level of about 3¼ inches from the bottom. This level was marked and labelled the 0 line. Then, 0.2 cc. of the defoaming composition was added to the beaker containing 500 cc. of the aforesaid concentrated black liquor. The concentrated black liquor was warmed to maintain the temperature at approximately 180° F. and was at this temperature during the operation of the test. In operation, the pump and stop watch were started simultaneously. The time in seconds for the foam to form and rise to the one inch level above the zero point was recorded. This time is an indication of the defoaming ability of the defoamer which is being tested. The longer the time required for the foam to form and to rise to the indicated mark, the better is the defoaming action of the defoamer.

EXAMPLE I

This example is directed to producing a defoamer in accordance with this invention utilizing a precipitated silica having a pH of 8.2, a surface area of 270 square meters per gram and an ultimate particle diameter of 0.012 micron.

1.6 parts of liquid dimethyl polysiloxane (Silicone L45) having a viscosity of 50 centistokes at 25° C. was added dropwise to 8.9 parts of a powdered precipitated silica (Quso G–30) having an average particle diameter of 0.012 micron, a pH of 8.2 and a surface area of 270 square meters per gram. During this addition the dimethyl polysiloxane and the precipitated silica were mixed by means of a gate type stirrer. After all of the dimethyl polysiloxane was added, mixing was continued for a period of 15 minutes until the formation of a dry homogeneous powder which indicated that all of the liquid polysiloxane had been absorbed on the powdered silica. This dry powder was then heated for a period of 16 hours at a temperature of 195° C. so as to permanently affix the liquid polysiloxane onto the powdered silica particles. After this period, the dry homogeneous powder was dispersed by agitation into 89.5 parts of mineral oil (Gulf 333, a mineral oil containing mostly paraffinic hydrocarbons having a viscosity of 108.1 SUS at 100° F. and a specific gravity of 0.870 at 60° F.) so as to form a gel-like dispersion. This gel-like dispersion was passed through a hand homogenizer to break up the gel-like structure and form a uniform dispersion. This dispersion was a flowable liquid.

EXAMPLE II

This example is directed to producing a defoamer utilizing a spreading agent.

5 parts of sulfonated oleic acid (spreading agent) is added to 95 parts of the defoamer produced in Example I. This defoamer was a flowable liquid.

EXAMPLE III

This example is directed to producing a defoamer utilizing a precipitated silica having a particle size of 0.012 micron, a surface area of 300 square meters per gram and a pH of 6.4.

A defoamer is prepared utilizing the exact method of Example I except that a precipitated silica (Quso F–20), having a particle size of 0.012 micron, a surface area of 300 square meters per gram and a pH of 6.4 was utilized in place of Quso G–30. The defoamer produced by this method was a flowable liquid.

EXAMPLE IV

This example is directed to producing the defoamer of this invention by adjusting the pH of the defoamer of Example III.

A defoamer was prepared utilizing the same procedure as in Example III except that an aqueous solution containing 10% by weight NaOH was added to the precipitated silica (Quso F–20), before mixing with the liquid dimethyl polysiloxane, in an amount sufficient to adjust the pH of the precipitated silica to 8.5. After this pH was reached the silica was dried in an oven.

EXAMPLE V

This example is directed to preparing a defoamer by utilizing a precipitated silica having a particle size of 0.1 micron, a surface area of 35 square meters per gram and a pH of 9.4.

A defoamer was prepared according to the procedure of Example I except that Hi-Sil 404 having a particle size of 0.1 micron, a surface area of 35 square meters per gram and a pH of 9.4 was utilized as the precipitated silica in place of Quso G-30.

EXAMPLE VI

This example is directed to producing a defoamer utilizing a precipitated silica having a particle size of 0.022 micron, a surface area of 150 square meters per gram and a pH of 6.5.

A defoamer was prepared in the same manner of Example I except that Hi-Sil 233 having a particle size of 0.022 micron, a surface area of 150 square meters per gram and a pH of 6.5 was used as the precipitated silica.

EXAMPLE VII

This example is directed to producing a defoamer by adjusting the pH of the precipitated silica utilized in Example VI to a pH of 8.3 so that the defoamer is prepared with a precipitated silica having a particle size of 0.022 micron, a surface of 150 square meters per gram and a pH of 8.3.

A defoamer is prepared in the same manner as in Example VI except that a solution of 0.1 N NaOH is added to the Hi-Sil 233 in an amount sufficient to adjust the pH to 8.3, before the Hi-Sil is mixed with the liquid dimethyl polysiloxane. After the pH of the silica had been adjusted to 8.3, the silica was dried in an oven for a period of about two hours.

EXAMPLE VIII

This example is directed to producing a defoamer utilizing a silica aerogel instead of a precipitated silica.

A defoamer is produced utilizing the procedure of Example I except that Syloid 244 (silica aerogel, having a particle size of 3.3, a surface area of 300 square meters per gram and a pH of 7), was utilized as the silica component.

EXAMPLE IX

This example is directed to producing a defoamer by adjusting the pH of a silica aerogel to 9.0.

A defoamer prepared in the same manner of Example VIII except that a sufficient amount of an aqueous solution containing 10% by weight of sodium hydroxide was added to Syloid 244 to raise its pH to 9 before it was mixed with dimethyl polysiloxane. After the pH of the silica had been adjusted to 9.0, the silica was dried in an oven for a period of about three hours.

EXAMPLE X

This example is directed to preparing a defoamer by utilizing a pyrogenic silica instead of a precipitated silica.

A defoamer was prepared in the same manner of Example I except that Cab-O-Sil M5 (a pyrogenic silica having a particle size of 0.015 micron, a surface area of 180 square meters per gram and a pH of 5.4) was used as the silica component.

EXAMPLE XI

This example is directed to producing a defoamer utilizing a spreading agent and a pyrogenic silica.

5 parts of sulfonated oleic acid (spreading agent) was added to 95 parts of the silica defoamer prepared in accordance with Example X.

EXAMPLE XII

The defoaming compositions of Examples I to XI were tested for their ability to defoam portions of concentrated black liquor containing about 16% by weight of solids in the manner hereinbefore described, by determining the time required for the concentrated black liquor to reach a one-inch level mark. Also tested in this manner was a portion of concentrated black liquor containing no defoamer. This sample was designated as the blank. The results of the tests are recorded in Table I below. All of the tests were carried out utilizing portions of the same batch of concentrated black liquor.

*Table 1*

RESULTS OF THE DEFOAMING TESTS CARRIED OUT ON THE COMPOSITION OF THE PRECEDING EXAMPLES

| Composition of example No.: | Time for foam to rise to one-inch level above the zero point (seconds) |
|---|---|
| I.[1] | 55 |
| II.[2] | 49 |
| I.[1] | 55 |
| III. | 8 |
| IV.[1] | 45 |
| I.[1] | 55 |
| V. | 15 |
| I.[1] | 55 |
| VI. | 15 |
| VII. | 25 |
| I.[1] | 55 |
| VIII. | 11 |
| IX. | 19 |
| I.[1] | 55 |
| X. | 8 |
| XI. | 25 |
| Blank | 2 |

[1] Defoamer of this invention.
[2] Defoamer of this invention plus a spreading agent.

The foregoing results demonstrate that the defoamers of this invention markedly reduce the foam which is produced in the concentrated black liquor as shown by a comparison of the defoaming data using Examples I and IV with that of the blank. Also this table demonstrates by comparing the results of the defoaming data utilizing Examples I and II, that the use of a spreading agent in the defoamer of this invention reduces rather than increases the effectiveness of the defoamer.

A comparison between the defoaming data of Examples III and IV demonstrates the superior results that are obtained by utilizing a precipitated silica that has a pH of from 8 to 10. This is shown by the fact that raising the pH of the silica used in the defoamer of Example III from 6.4 to 8.5 in Example IV, while keeping the surface area and the average particle diameter constant increases the defoaming ability of the defoamer approximately five times.

As shown by a comparison of the defoaming data using Example I with that of Example V, it is necessary to utilize a precipitated silica particle having a surface area of from about 200 to 400 square meters per gram and an average particle diameter of from 0.005 to 0.050 micron in order to produce a defoamer having the improved properties of the defoamers of this invention. This is shown by the fact that the defoaming results produced by utilizing a defoamer containing a precipitated silica having a surface area of 270 square meters per gram and an average particle diameter of 0.012 micron (Example I) was about 3.5 times as effective as utilizing a defoamer containing a precipitated silica having a surface area of 35 square meters per gram and an average particle diameter of 0.1 micron (Example V) even though the pH in cases was about 8 and 10.

As shown by the comparison of the results of the defoaming data of Example VI and VIII with that of I, utilizing a precipitated silica having a surface area within the range of 200 to 400 square meters per gram, provides a defoamer having twice the defoaming ability than that of a defoamer containing a precipitated silica having a surface area lower than this range. Thus, as seen by comparing the defoaming results of Example VII with that of I, the fact that the pH of the precipitated silica is within the range of 8 to 10 and the average particle diameter of the silica is within the range of from 0.05 to 0.005 and does not produce the improved defoaming properties of this invention as long as the surface area is not within the claimed range.

As shown by comparing the defoaming data using Examples VIII, IX, X and XI with that of Example I, in order to produce the improved defoamer of this invention, it is necessary to utilize a precipitated silica. This is shown clearly by the fact that defoamers produced by utilizing pyrogenic silica or an aerogel silica do not produce the improved defoaming results of the defoamers of this invention. As shown by comparing the defoaming data of Example XI with that of I, the fact that a spreading agent is added to a defoamer containing a silica that does not have the same properties as the silica utilized in preparing the defoamer of this invention, does not produce the improved defoaming properties of the defoamers of this invention.

Hence, as shown by the defoaming results of Table I, the improved defoaming results of this invention can only be obtained by utilizing a precipitated silica having a pH of from 8 to 10, a surface area of from 200 to 400 square meters per gram and an average particle diameter of from about 0.005 to about 0.050 micron in preparing the defoamer.

Examples XII through XX are directed to the defoamers of this invention produced in the manner of Example I except that different liquid hydrocarbons and different proportions of the components are utilized.

EXAMPLE XIIA
Materials: Parts by weight
Precipitated silica (Quso G-30) _____ 8.9
Dimethyl polysiloxane (Silicone L45 having a viscosity of 50 centistokes at 25° C.) _____ 1.6
Mineral oil (Gulf 530, containing hydrocarbons, having a viscosity of 103 SUS at 100° F. and a specific gravity of 0.815 at 60° F.) _ 89.5

EXAMPLE XIII
Materials:
Precipitated silica (Quso G-30) _____ 8.9
Dimethyl polysiloxane (Silicone L45 having a viscosity of 50 centistokes at 25° C.) _____ 1.6
Mineral oil (Esso 1237, containing predominantly paraffinic hydrocarbons, having a viscosity of 109 SUS at 100° F. and a flash point of 385° F.) _____ 89.5

EXAMPLE XIV
Materials:
Precipitated silica (Quso G-30) _____ 89
Dimethyl polysiloxane (Silicone L45 having a viscosity of 50 centistokes at 25° C.) _____ 1.6
Mineral oil (Esso 1383, an oil containing predominantly paraffinic hydrocarbons, having a viscosity of 103 SUS at 100° F. and a boiling point of 875° F.) _____ 89.5

EXAMPLE XV
Materials:
Precipitated silica (Quso G-30) _____ 8.9
Dimethyl polysiloxane (Silicone L45, having a viscosity of 50 centistokes at 25° C.) ____ 1.6
Mineral oil (Esso 1305, having predominantly paraffinic hydrocarbons having a viscosity of 111 SUS at 100° F. and a flash point of 360) _ 89.5

EXAMPLE XVI
Materials:
Precipitated silica (Quso G-30) _____ 16.8
Dimethyl polysiloxane (Silicone L45, having a viscosity of 50 centistokes at 25° C.) _____ 3.2
Mineral oil (Gulf 333) _____ 80

EXAMPLE XVII
Materials:
Precipitated silica (Quso G-30) _____ 13
Dimethyl polysiloxane (Silicone L45, having a viscosity of 50 centistokes at 25° C.) _____ 2
Mineral oil (Gulf 333) _____ 85

EXAMPLE XVIII
Materials:
Precipitated silica (Quso G-30) _____ 8.5
Dimethyl polysiloxane (Silicone L45, having a viscosity of 50 centistokes at 25° C.) _____ 1.5
Mineral oil (Gulf 333) _____ 90.0

EXAMPLE XIX
Materials:
Precipitated silica (Quso G-30) _____ 6.5
Dimethyl polysiloxane (Silicone L45, having a viscosity of 50 centistokes at 25° C.) ____ 1.0
Mineral oil (Gulf 333) _____ 92.5

EXAMPLE XX
Materials:
Precipitated silica (Quso G-30) _____ 4.2
Dimethyl polysiloxane (Silicone L45, having a viscosity of 50 centistokes at 25° C.) ____ 0.8
Mineral oil (Gulf 333) _____ 95.0

EXAMPLE XXI

The defoaming compositions of Examples XIII to XX were tested for their ability to foam portions of concentrated black liquor containing 16% by weight of solids in the manner hereinbefore described by determining the time required for the concentrated black liquor to reach the one-inch level mark. Also tested in this manner was the defoamer of Example I. A test was carried out utilizing a portion of concentrated black liquor containing no defoamer. This sample was designated as the blank. The results of all the tests were recorded in Table II below. All of these tests were carried out utilizing portions of the same batch of concentrated black liquor. The percent efficiency, which is the time in seconds for the foam to rise to the one-inch level for a specific example, divided by the time in seconds for the foam to rise to a one-inch level utilizing the defoamer of Example I, multiplied by 100, was calculated to give the comparative results of each of the defoamers of Examples XIII to XX with the defoamer of Example I.

*Table II*

RESULTS OF THE DEFOAMING TESTS CARRIED OUT ON THE COMPOSITION OF THE PRECEDING EXAMPLES

| Composition of Example No. | Time for foam to rise to one-inch level, about the zero point (seconds) | Percent efficiency |
| --- | --- | --- |
| XIII | 36 | 120 |
| XIV | 30 | 100 |
| XV | 33 | 108 |
| XVI | 27 | 90 |
| XVII | 40 | 130 |
| XVIII | 30 | 100 |
| XIX | 33 | 110 |
| XX | 31 | 103 |
| I | 30 | 100 |
| Blank | 2 | 7 |

The foregoing results show that the defoamers of this invention markedly reduce the foam that is produced in concentrated black liquor as shown by a comparison of the results of the defoaming data using Examples XIII to XX with that of the blank. The percent efficiency is given to show a comparison of the defoaming results utilizing the defoamers of Examples XIII to XX with the results obtained utilizing the defoamer of Example I. In this manner the defoamer of Example I is used as a standard to determine the efficiency of the defoamers prepared in Examples XIII to XX. As seen from the results of Table II, the defoamers of Examples XIII to XX perform approximately as well as the defoamers of Example I.

EXAMPLE XXII

This example is directed to demonstrating that the defoamer compositions of this invention are effective as defoamers for latex paints.

250 grams of Du Pont white paint having a viscosity of 92 K.U. at 60° F. (Krebs units) and a weight per gallon of 11.7 pounds per gallon was shaken by means of a conventional paint shaker for five minutes. At the end of this period, the weight per gallon of paint was determined to be 9.8 pounds per gallon which showed that foaming of the paint occurred thus reducing the density of the paint.

0.6 gram of the defoamer of Example I was added under constant stirring to 250 grams of the Du Pont white paint having a viscosity of 92 K.U. and a weight per gallon of 11.7 pounds per gallon. This paint containing the defoamer was shaken for five minutes by means of a conventional paint shaker for a period of five minutes. At the end of this period the weight per gallon of the paint was determined to be 11.7 pounds per gallon which showed that no foaming had occurred. Hence the defoamer of this invention had repressed foaming of the paint.

The paint was then applied to glass. Upon drying a thin uniform film of paint coated the glass which showed that the addition of the foaming agent to the paint produced no adverse effects.

Having described our invention what we claim as new and desire to secure by Letters Patent is:

1. A defoaming composition consisting essentially of from about 3% to about 30% by weight of a hydrophobic precipitated silica dispersed in from about 97% to 70% by weight of an organic hydrocarbon liquid, selected from the group consisting of aliphatic hydrocarbons, alicyclic hydrocarbons, aromatic hydrocarbons, and mixtures thereof, said organic liquid having a boiling point of at least 150° F., said hydrophobic precipitated silica containing solid silica particles having a pH of from about 8 to 10, an average particle diameter from about 0.005 to 0.05 micron and an average surface area of from about 200 to 400 square meters per gram.

2. The defoaming composition of claim 1 wherein said precipitated silica has a pH of from about 8 to 9, an average particle diameter of from about 0.009 to 0.02 micron and an average surface area of about 250 to 300 square meters per gram.

3. A defoaming composition consisting essentially of from about 3% to about 30% by weight of hydrophobic precipitated silica dispersed in from about 97% to 70% by weight of an organic hydrocarbon liquid selected from the group consisting of aliphatic hydrocarbons, alicyclic hydrocarbons, aromatic hydrocarbons and mixtures thereof, said liquid having a boiling point of at least 150° F., said hydrophobic silica containing solid silica particles having a pH of from about 8 to 10, an average particle diameter from about 0.005 to 0.05 micron and an average surface area of from about 200 to 400 square meters per gram, said solid silica particles having permanently affixed thereon, from about 0.5% to about 50% by weight of said hydrophobic silica of an organic hydrophobic liquid having a viscosity of from about 10 to 3,000 centistokes selected from the group consisting of alkyl polysiloxanes, aryl polysiloxanes, aralkyl polysiloxanes, and alicyclic polysiloxanes.

4. A defoaming composition consisting essentially of from about 3% to about 30% by weight of a hydrophobic precipitated silica dispersed in from about 70% to 97% by weight of a non-polar organic hydrocarbon liquid, said hydrophobic precipitated silica containing solid silica particles having a pH of from about 8 to 10, an average particle diameter of from about 0.005 to 0.05 micron and an average surface area of from about 200 to 400 square meters per gram.

5. A method of preparing a defoaming composition consisting essentially of the steps of providing a mixture consisting of from about 0.5% to 20% by weight of an organic liquid polysiloxane selected from the group consisting of alkyl polysiloxanes, aryl polysiloxanes, aralkyl polysiloxanes and alicyclic polysiloxanes, said polysiloxanes having a viscosity of from about 10 to about 3,000 centistokes and from about 99.5% to 80% by weight of a precipitated silica having an average particle diameter of from about 0.005 to 0.05 micron, a pH of from about 8 to 10 and an average surface area of from 200 to 400 square meters per gram, heating said mixture to a temperature of above 150° C. for a period of at least one-half hour so as to permanently affix said polysiloxane liquid on said precipitated silica to form a hydrophobic silica and dispersing said mixture into from about 70% to 97% by weight of a hydrophobic non-polar liquid having a boiling point of at least 150° F., said liquid being selected from the group consisting of aliphatic hydrocarbons, alicyclic hydrocarbons, aromatic hydrocarbons and mixtures thereof.

6. A method of preparing a defoaming composition consisting essentially of the steps of providing a mixture consisting of from about 0.5% to 50% by weight of a liquid organo-halo silane and from about 99.5% to 50% by weight of a precipitated silica having an average particle diameter of from about 0.005 to 0.05 micron, a pH of from about 8 to 10 and an average surface area of from 200 to 400 square meters per gram, heating said mixture to a temperature of above 150° C. for a period of at least one-half hour so as to permanently affix said silane on said precipitated silica to form a hydrophobic silica and dispersing said mixture into from about 70% to 97% of a hydrophobic non-polar liquid having a boiling point of at least 150° F., said liquid being selected from the group consisting of aliphatic hydrocarbons, alicyclic hydrocarbons, aromatic hydrocarbons and mixtures thereof.

7. A method of defoaming aqueous systems containing foam producing solids comprising adding to the system, from about 0.01% to 0.5% by weight of said foam producing solids, a defoaming composition consisting essentially of from about 3% to 30% by weight of a hydrophobic precipitated silica dispersed in from about 70% to 97% by weight of a hydrophobic non-polar organic liquid having a boiling point of at least 150° F., said hydrophobic silica containing solid silica particles having a pH of from about 8 to 10, an average particle diameter of from about 0.005 to 0.05 micron and an average surface area of from about 200 to 400 square meters per gram.

8. A method of defoaming aqueous systems containing foam producing solids comprising adding to the system, from about 0.01% to 0.5% by weight of said foam producing solids of a defoaming composition consisting essentially of from about 3% to 30% by weight of a precipitated hydrophobic silica dispersed in from about 97% to 70% by weight of an organic hydrocarbon liquid, selected from the group consisting of aliphatic hydrocarbons, alicyclic hydrocarbons, aromatic hydrocarbons, and mixtures thereof, said liquid having a boiling point of at least 150° F., said hydrophobic silica containing solid silica particles having a pH of from about 8 to 10, an average particle diameter from about 0.005 to 0.05 micron and an average surface area of from about 200 to 400 square meters per gram, said silica particles having adsorbed thereon, from about 0.5% to about 50% by weight of said hydrophobic silica of an organic hydrophobic liquid having a viscosity of from about 10 to 3000 centistokes.

9. The method of claim 8 wherein said organic hydrophobic liquid is selected from the group consisting of alkyl polysiloxanes, aryl polysiloxanes, aralykyl polysiloxanes and alicyclic polysiloxanes.

References Cited by the Examiner
UNITED STATES PATENTS
2,306,222 12/42 Patnode _____ 117—106
2,412,470 12/46 Norton _____ 117—106
2,595,928 5/52 Currie et al. _____ 252—358
2,829,112 4/58 Solomon _____ 252—358
2,894,913 7/59 Sullivan et al. _____ 252—358
3,076,768 2/63 Boylan _____ 252—358

JULIUS GREENWALD, Primary Examiner.

---

UNITED STATES PATENT OFFICE
CERTIFICATE OF CORRECTION

Patent No. 3,207,698            September 21, 1965

Raymond Liebling et al.

It is hereby certified that error appears in the above numbered patent requiring correction and that the said Letters Patent should read as corrected below.

Column 1, line 42, for "or larger" read -- on large --; column 4, line 18, for "included" read -- include --; column 9, line 54, for "89" read -- 8.9 --.

Signed and sealed this 29th day of March 1966.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,207,698 September 21, 1965

Raymond Liebling et al.

It is hereby certified that error appears in the above numbered patent requiring correction and that the said Letters Patent should read as corrected below.

Column 1, line 42, for "or larger" read -- on large --; column 4, line 18, for "included" read -- include --; column 9, line 54, for "89" read -- 8.9 --.

Signed and sealed this 29th day of March 1966.

(SEAL)
Attest:

ERNEST W. SWIDER
Attesting Officer

EDWARD J. BRENNER
Commissioner of Patents